United States Patent
Marsden et al.

(10) Patent No.: US 7,517,384 B2
(45) Date of Patent: *Apr. 14, 2009

(54) METHOD FOR IMPROVING METALS RECOVERY USING HIGH TEMPERATURE PRESSURE LEACHING

(75) Inventors: John O. Marsden, Phoenix, AZ (US); Robert E. Brewer, Park City, UT (US); Joanna M. Robertson, Thatcher, AZ (US); David R. Baughman, Golden, CO (US); Philip Thompson, West Valley City, UT (US); Wayne W. Hazen, Lakewood, CA (US); Roland Schmidt, Golden, CO (US)

(73) Assignee: Phelps Dodge Corporation, Phoenix, AZ (US)

( * ) Notice: Subject to any disclaimer, the term of this patent is extended or adjusted under 35 U.S.C. 154(b) by 32 days.

This patent is subject to a terminal disclaimer.

(21) Appl. No.: 11/551,907

(22) Filed: Oct. 23, 2006

(65) Prior Publication Data

US 2007/0039420 A1   Feb. 22, 2007

Related U.S. Application Data

(63) Continuation of application No. 10/907,324, filed on Mar. 29, 2005, now Pat. No. 7,125,436, which is a continuation of application No. 10/650,167, filed on Aug. 27, 2003, now Pat. No. 6,893,482, which is a continuation of application No. 10/238,088, filed on Sep. 9, 2002, now Pat. No. 6,626,979, which is a continuation of application No. 09/912,967, filed on Jul. 25, 2001, now Pat. No. 6,451,088.

(51) Int. Cl.
   C22B 3/04    (2006.01)

(52) U.S. Cl. .............................. 75/739; 75/743; 75/744
(58) Field of Classification Search ................... 75/739, 75/743, 744
   See application file for complete search history.

(56) References Cited

U.S. PATENT DOCUMENTS

| | | | |
|---|---|---|---|
| 4,304,644 A | | 12/1981 | Victorovich |
| 6,626,979 B2 * | | 9/2003 | Marsden et al. ............... 75/739 |
| 6,660,059 B2 * | | 12/2003 | Ji et al. ......................... 75/744 |
| 6,746,512 B1 * | | 6/2004 | Shaw ............................ 75/743 |
| 6,893,482 B2 * | | 5/2005 | Marsden et al. ............... 75/739 |
| 7,125,436 B2 * | | 10/2006 | Marsden et al. ............... 75/724 |

FOREIGN PATENT DOCUMENTS

WO   WO9707248 D9   2/1997

* cited by examiner

*Primary Examiner*—Roy King
*Assistant Examiner*—Tima M McGuthry-Banks
(74) *Attorney, Agent, or Firm*—Snell & Wilmer, L.L.P.

(57) ABSTRACT

The present invention is directed to a system for recovering metal values from metal-bearing materials. During a reactive process, a seeding agent is introduced to provide a nucleation site for the crystallization and/or growth of solid species which otherwise tend to passivate the reactive process or otherwise encapsulate the metal value, thereby reducing the amount of desired metal values partially or completely encapsulated by such material. The seeding agent may be generated in a number of ways, including the recycling of residue or the introduction of foreign substances. Systems embodying aspects of the present invention may be beneficial for recovering a variety of metals such as copper, gold, silver, nickel, cobalt, molybdenum, zinc, rhenium, uranium, rare earth metals, and platinum group metals from any metal-bearing material, such as ores and concentrates.

19 Claims, 2 Drawing Sheets

METHOD FOR IMPROVING METALS RECOVERY USING HIGH TEMPERATURE PRESSURE LEACHING

CROSS-REFERENCE TO RELATED APPLICATIONS

This application is a continuation of U.S. patent application Ser. No. 10/907,324, filed on Mar. 29, 2005 and issued as U.S. Pat. No. 7,125,436 on Oct. 24, 2006, which is a continuation of U.S. patent application Ser. No. 10/650,167, filed on Aug. 27, 2003 and issued as U.S. Pat. No. 6,893,482 on May 17, 2005, which is a continuation of U.S. patent application Ser. No. 10/238,088, filed on Sep. 9, 2002 and issued as U.S. Pat. No. 6,626,979 on Sep. 30, 2003, which is a continuation of U.S. patent application Ser. No. 09/912,967, filed on Jul. 25, 2001 and issued as U.S. Pat. No. 6,451,088 on Sep. 17, 2002, the disclosures and contents of which are hereby incorporated by reference.

FIELD OF INVENTION

This process relates generally to a process for recovering metals from metal-bearing materials, and more specifically, a process for recovering copper and other metals through high temperature pressure leaching in a pressure leaching vessel wherein a seeding agent is added to the pressure leaching vessel during the oxidation process.

BACKGROUND OF THE INVENTION

This process relates generally to a process for recovering metals from metal-bearing materials, and more specifically, a process for recovering copper and other metals through high temperature pressure leaching in a pressure leaching vessel wherein a seeding agent is added to the pressure leaching vessel during the oxidation process.

The recovery of copper from copper sulfide concentrates using pressure leaching has proven to be a potentially economically attractive alternative to smelting. Pressure leaching operations generally produce less fugitive emissions than smelting operations, and thus, environmental benefits may be realized. Further, pressure leaching circuits may be more cost-effectively constructed on-site at a concentrator, eliminating the expense associated with concentrate transportation that smelting operations may require. Further, any by-product acid produced in the pressure leaching circuit may be used in adjacent heap leaching operations, thus offsetting the costs associated with purchased acid.

On the other hand, the application of pressure leaching may result in unacceptably high copper and precious metal losses. A significant cause of such metal losses has been identified when metal values become occluded by materials present in the pressure leaching vessel, such as, for example, hematite and/or other materials, rendering these metal values unavailable to subsequent processing, which results in these metal values being lost.

An effective and efficient method to recover copper from copper-containing materials, especially copper from copper sulfides such as chalcopyrite and chalcocite, that enables high copper recovery to be achieved at a reduced cost over conventional processing techniques and that enhances the recovery of precious metals from metal-bearing materials would be advantageous.

SUMMARY OF THE INVENTION

While the way in which the present invention addresses the deficiencies and disadvantages of the prior art is described in greater detail below, in general, according to various aspects of the present invention, a process for recovering copper and other metal values from a metal-bearing material includes various reactive and recovery processes. In a preferred aspect of the invention, a seeding agent is introduced to the metal recovery process, most preferably, during a pressure leaching process.

In accordance with an exemplary embodiment of the present invention, a process for recovering metal from a metal-bearing material generally includes the steps of: (i) subjecting a concentrate containing a metal value to a pressure leaching process, wherein the pressure leaching vessel is seeded with a seeding agent; and (ii) extracting the metal value from the product of the reactive process. In one aspect of an alternative embodiment of the invention, the seeding agent may be recycled residue that is introduced to the pressure leaching vessel. In general, the seeding agent is selected to enable the formation of a nucleation site for the crystallization and/or growth of solid species derived from the solution in which the reactive process occurs. In a further aspect of the present invention, other foreign material may be used as a seeding agent during pressure leaching. In an additional aspect of the present invention, a combination of seeding agents may be used during pressure leaching.

In yet another embodiment of the present invention, copper is recovered from a metal-bearing material. The copper-containing material is subjected to high temperature pressure leaching in a pressure leaching vessel, wherein a seeding agent is introduced into the pressure leaching vessel, which preferably is a multi-compartment pressure leaching vessel. The pressure leaching product may then undergo one or more subsequent conditioning and/or refining processes such that copper and/or other metal values may be recovered from the pressure leaching product or products.

The advantages of a process according to the various aspects of the present invention will be apparent to those skilled in the art upon reading and understanding the following detailed description with reference to the accompanying drawing figures.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description and claims when considered in connection with the drawing figures, wherein like numerals denote like elements and wherein:

DETAILED DESCRIPTION

The present invention relates to a metal recovery process that implements pressure leaching vessel seeding. Generally, a material bearing a metal value is subjected to a pressure leaching process wherein a seeding agent is utilized. Metal values may then be recovered and processed in accordance with various recovery processes.

Figure 1:
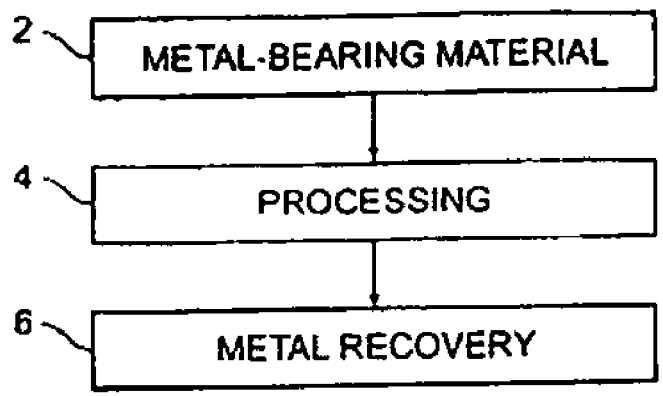
FIG. 1 illustrates a flow diagram of a metal recovery process in accordance with an exemplary embodiment of the present invention.

Referring to FIG. 1, in accordance with various aspects of the present invention, a metal-bearing material 2 is provided for processing. Metal-bearing material 2 may be an ore, a concentrate, or any other material from which metal values may be recovered. Metal values such as, for example, copper, gold, silver, zinc, platinum group metals, nickel, cobalt, molybdenum, rhenium, uranium, rare earth metals, and the like may be recovered from metal-bearing materials in accordance with various embodiments of the present invention. Various aspects and embodiments of the present invention, however, prove especially advantageous in connection with the recovery of copper and gold from gold-bearing copper sulfide ores, such as, for example, gold-bearing chalcopyrite ($CuFeS_2$), chalcocite ($Cu_2S$), bornite ($Cu_5FeS_4$), and covellite (CuS). Thus, metal-bearing material 2 preferably is a gold-bearing copper ore or concentrate, and most preferably, is a gold-bearing copper sulfide ore or concentrate.

Metal-bearing material 2 may be prepared for pressure leaching processing in any manner that enables the conditions of metal-bearing material 2—such as, for example, particle size, composition, and component concentration—to be suitable for the chosen processing method, as such conditions may affect the overall effectiveness and efficiency of processing operations. Desired composition and component concentration parameters can be achieved through a variety of chemical and/or physical processing stages, the choice of which will depend upon the operating parameters of the chosen processing scheme, equipment cost and material specifications. For example, metal-bearing material 2 may undergo comminution, flotation, blending, and/or slurry formation, as well as chemical and/or physical conditioning.

Referring again to FIG. 1, after metal-bearing material 2 has been suitably prepared for processing, it is subjected to a processing step 4. Processing step 4 may be any suitable process or reaction that puts a metal value in metal-bearing material 2 in a condition such that it may be subjected to later recovery steps. For example, exemplary suitable processes include reactive processes which tend to liberate a desired metal value in the metal bearing material 2 from the metal-bearing material 2. In accordance with one embodiment of the present invention, processing step 4 comprises pressure leaching, either at medium temperatures (e.g., from about 120° C. to about 190° C.) or high temperatures (e.g., greater than about 200° C.).

In accordance with another embodiment of the invention, processing step 4 comprises a high temperature pressure leaching process operating at a temperature in the range of about 170° C. to about 235° C., more preferably from about 200° C. to about 230° C., and optimally above about 200° C.

Processing step 4 may occur in any pressure leaching vessel suitably designed to contain the pressure leaching mixture at the desired temperature and pressure conditions for the requisite pressure leaching residence time. Preferably, the pressure leaching vessel used in processing step 4 is an agitated, multi-compartment pressure leaching vessel. However, it should be appreciated that any pressure leaching vessel that suitably permits metal-bearing material to be prepared for metal recovery may be utilized within the scope of the present invention.

Processing step 4 may occur in any pressure leaching vessel suitably designed to contain the pressure leaching mixture at the desired temperature and pressure conditions for the requisite pressure leaching residence time. Preferably, the pressure leaching vessel used in processing step 4 is an agitated, multi-compartment pressure leaching vessel. However, it should be appreciated that any pressure leaching vessel that suitably permits metal-bearing material to be prepared for metal recovery may be utilized within the scope of the present invention.

In accordance with a preferred aspect of the present invention, a seeding agent is introduced to the reactive process during processing step 4, prior to metal value recovery. While a seeding agent may be utilized, care should be taken to ensure that it does not negatively impact the overall metal recovery process. A suitable seeding agent preferably comprises any material capable of forming a nucleation site for the crystallization and/or growth of solid species. For example, in accordance with various aspects of the present invention, as discussed hereinabove, a metal to be recovered is liberated in connection with the reactive process. The present inventors have found that often materials that precipitate or crystallize from solution tend to passivate the reactive process and/or encapsulate a metal or metals to be recovered. Through use of the inventive seeding agent, such species are urged to crystallize, precipitate or otherwise form at or in proximity to the seeding agent, instead of the metal value, thus leaving the metal value exposed and amenable to subsequent leaching or other recovery.

Accordingly, the seeding agent may be any particle which acts as a site for particle accumulation and/or precipitation, and may originate from recycled materials from other stages of the metal recovery process or may be provided by the addition of substances that are foreign to the metal recovery process. In some cases, the seeding agent comprises any material that promotes crystallization, precipitation, and/or growth of unwanted materials—for example in the preferred case of copper recovery, hematite, gangue, and the like—that may otherwise tend to partially or completely encapsulate the desired metal values, rendering the desired metal values (e.g., copper and gold) generally unavailable or less accessible to a lixiviant solution. As is known, in precipitation, seed particles tend to grow in size through deposition of materials from solution. Accordingly, non-preferential precipitation onto other (i.e., non-seed) material surfaces may also occur.

One source of suitable seeding agents useful in accordance with various aspects of the present invention are those materials which can be found in the pressure leaching vessel discharge, which materials may be recycled for seeding purposes. Use of the recycled pressure leaching vessel discharge may be desirable for economic reasons, and using a seeding agent that is similar or identical to unwanted particles in the pressure leaching process slurry may tend to encourage the accumulation of unwanted material. For example, in metal recovery processes where an unwanted material, such as hematite, is either present in the metal-bearing material or is produced as a by-product, introduction of recycled hematite-containing residue from previous pressure leaching processes likely will tend to provide newly formed or liberated hematite a preferential nucleation site. In the absence of this nucleation site, unreactive particles may occlude the desired metal values to solubilization by precipitating on the surface of the metal values, rendering the metal values unrecoverable.

Therefore, introducing a seeding agent to prevent such occlusion may assist in providing better metal recovery.

Another source of suitable seeding agents useful in accordance with various aspects of the present invention are other by-products of the recovery process. For example, in cases where the metal-bearing material selected for use in connection with the recovery process of the present invention comprises multiple metal values, for example, copper, gold, and/or silver, it may be desirable to recover the metals in sequential recovery steps. For example, if copper is initially recovered through a pressure leaching process, gold and silver may be thereafter recovered, for example, through the use of cyanide leaching. In such a case, the cyanide-attenuated cyanide leach tailings may suitably be used as a seeding agent in accordance with the present invention.

A seeding agent suitable in accordance with a further aspect of the present invention may also be a material that is not a by-product of any reactive processing. For example, particles that are foreign to the recovery process, such as hematite, sand, silica sand, clays, and/or jarosite may be used. Still further, generally unreactive particulate materials such as, for example, low grade concentrate, tailings, or intermediate product streams from mineral processing activities, may be added to the pressure leaching vessel. It should be appreciated, however, that in accordance with various aspects of the present invention, any material that is capable of forming a nucleation site for the crystallization and/or growth of solid species is within the scope of the invention.

In accordance with still further aspects of the present invention, the seeding agent may be suitably selected and varied during operation of a continuous recovery process. For example, again for purposes of illustration only, in cases where the metal-bearing material selected contains copper and other precious metals, such as gold and/or silver, the seeding material initially may be a generally unreactive additive, for example, hematite, and thereafter processing by-products, such as, for example solid-liquid separation residue, cyanide-attenuated cyanide leach tailings, and the like, may be recycled to the reactive process and serve as the seeding agent during continued operation of the recovery process.

Subsequent to metal-bearing material 2 undergoing the reactive processing of step 4, the metal values that have been made available by the reactive process may undergo various recovery processes. Referring again to FIG. 1, recovery process 6 may be any process for recovering metal values, and may include any number of preparatory or conditioning steps. For example, a metal-bearing solution may be prepared and conditioned for metal recovery through one or more chemical and/or physical processing steps. The metal-bearing solution may be conditioned to adjust the composition, component concentrations, solids content volume, temperature, pressure, and/or other physical and/or chemical parameters to desired values. Generally, a properly conditioned metal-bearing solution will contain a relatively high concentration of soluble metal, for example, copper ions and sulfate in solution and preferably will contain few impurities. Moreover, the conditions of the metal-bearing solution preferably are kept substantially constant to enhance the quality and uniformity of the metal product ultimately recovered.

In one aspect of a preferred embodiment of the present invention, conditioning of a copper-containing solution for copper recovery in an electrowinning circuit begins by adjusting certain physical parameters of the product slurry from the reactive processing step. In a preferred aspect of this embodiment of the invention, wherein the reactive processing step is high temperature pressure leaching, it is desirable to reduce the temperature and pressure of the product slurry. A preferred method of so adjusting the temperature and pressure characteristics of the copper-containing product slurry from a high temperature pressure leaching stage is atmospheric flashing.

In accordance with further aspects of this preferred embodiment, after the product slurry has been subjected to atmospheric flashing using, for example, a flash tank, the product slurry may be further conditioned in preparation for later metal-value recovery steps. For example, one or more solid-liquid phase separation stages may be used to separate solubilized metal solution from solid particles. This may be accomplished in any conventional manner, including use of filtration systems, counter-current decantation (CCD) circuits, thickeners, centrifuges, and the like. A variety of factors, such as the process material balance, environmental regulations, residue composition, economic considerations, and the like, may affect the decision whether to employ a CCD circuit, a thickener, a filter, or any other suitable device in a solid-liquid separation apparatus. However, it should be appreciated that any technique of conditioning the product slurry for later metal value recovery is within he scope of the present invention.

As further discussed hereinbelow, the separated solids may further be subjected to later processing steps, including precious metal or other metal value recovery, such as, for example, recovery of gold, silver, platinum group metals, nickel, cobalt, molybdenum, zinc, rhenium, uranium, rare earth metals, and the like. Alternatively, the separated solids may be used for seeding purposes during reactive processing as described above, or may be subject to disposal.

The liquid separated from a liquid-solid separation apparatus may also undergo a series of conditioning steps to prepare the metal values solubilized therein for metal recovery. For example, the separated liquid may undergo various reagent additions and/or solvent extraction stages to put the metal values in a state such that the metal values are susceptible to metal recovery techniques. Further, subsequent conditioning and/or processing steps may be undertaken such that recovery rates are as efficient as possible.

After any desired preparation steps, the pressure leaching product stream may undergo the desired metal recovery step. The metal value recovery method may include any suitable conventional method of removing the desired metal values from solutions, such as, for example, electrowinning, precipitation, solvent extraction, cyanidation, ion exchange, and/or ion flotation, and preferably results in a relatively pure metal product.

Figure 2:
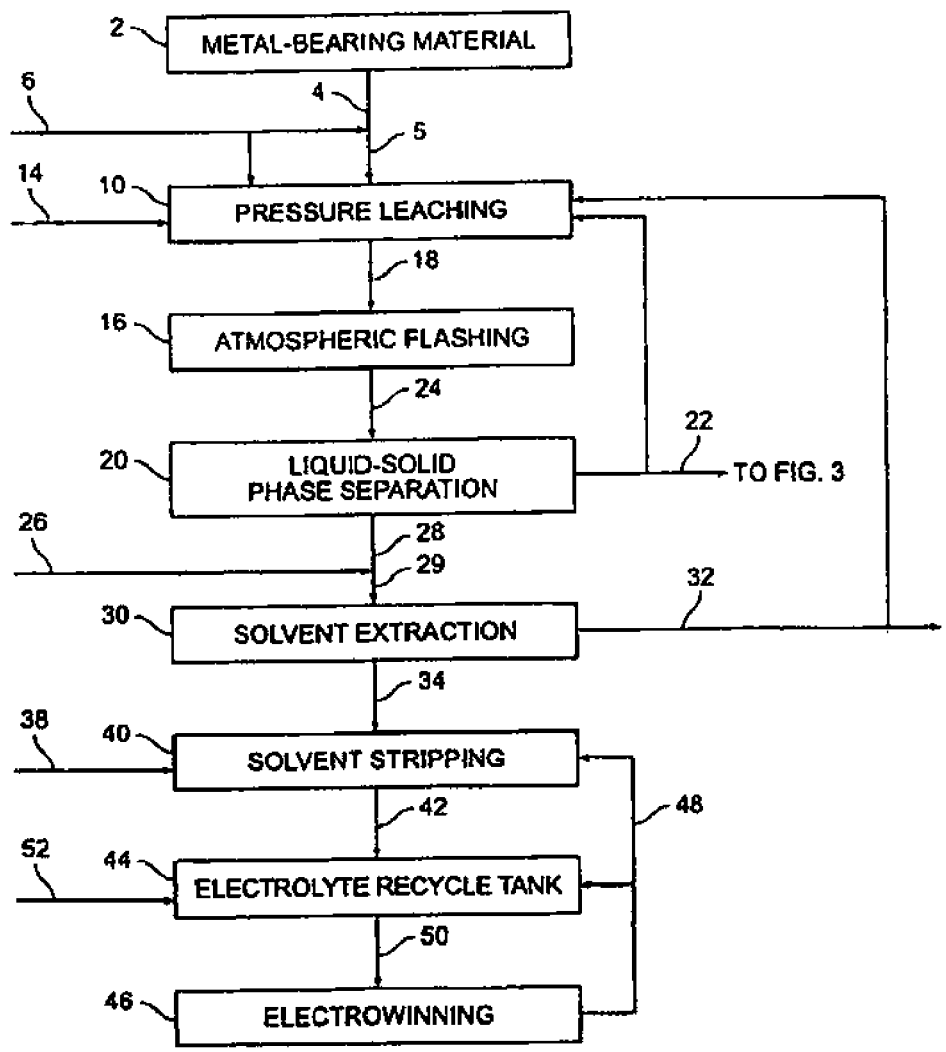
FIG. 2 illustrates a flow diagram of an exemplary metal recovery process in accordance with an alternative embodiment of the present invention.

In an exemplary embodiment of the present invention illustrated in FIG. 2, a copper-containing feed stream 4 containing a copper-containing material 2 is provided for metal value recovery. The copper in copper-containing material 2 may be in any form from which copper may be extracted, such as copper oxide or copper sulfide, for example chalcopyrite ($CuFeS_2$), chalcocite ($Cu_2S$), bornite ($Cu_5FeS_4$), and covellite (CuS). Copper-containing material 2 also may include any number of a variety of other metals, such as gold, silver, platinum group metals, zinc, nickel, molybdenum, cobalt, rare earth metals, rhenium, uranium, and/or mixtures thereof.

In accordance with one embodiment of the present invention, feed stream 4 is combined with a liquid 6, which may comprise water, to form a feed slurry 5. Feed slurry 5 is then subjected to a pressure leaching step 10. Alternatively, feed stream 4 may be directly fed into a pressure leaching device (step 10), such as a pressure leaching vessel, together with other feed streams, namely feed stream 6.

In one embodiment (not shown in FIG. 2), copper-containing material feed stream 4 is prepared for pressure leaching by comminuting a copper-containing material and subjecting it to flotation. In this case, feed stream 4 is combined with a liquid, preferably water, to form feed slurry 5, is subjected to pressure leaching (step 10 in FIG. 2). The combination of liquid with feed stream 4 can be effectuated using any one or more of a variety of techniques and apparatus, such as, for example, in-line blending or using a mixing tank or other suitable vessel. The combined material may then be subjected to a flotation processing step (not shown), and the flotation product thereafter may be filtered, air dried, and repulped before being subjected to pressure leaching.

With continued reference to FIG. 2, feed slurry 5 is suitably introduced to a pressure leaching vessel to undergo high temperature pressure leaching; as such, the pressure leaching vessel preferably comprises a sealed, multi-compartment pressure leaching vessel 10. Feed slurry 5 may have a solid particle size on the order of less than about 100 microns, preferably ranging from about 45 to about 60 microns. More preferably, the solid particle size of feed slurry 5 is suitably dimensioned such that the size distribution of no more than about 20% of the concentrated copper-containing materials is larger than about 60 microns. In accordance with a preferred aspect of this embodiment, feed slurry 5 has a preferred solid-liquid ratio ranging from about 5 percent to about 50 percent solids by weight, and preferably from about 10 percent to about 35 percent solids by weight.

Any agent capable of assisting in the solubilization of the metal value to be recovered (e.g., copper), such as, for example, sulfuric acid, may be provided during the pressure leaching process in a number of ways. For example, such acids may be provided in a cooling stream provided by the recycle of the raffinate solution 32 from the solvent extraction step 30 (before or after solubilization, see FIG. 3), and/or the recycle of a portion of the liquid phase of the product slurry 18, and/or by the production during pressure leaching of a sulfuric acid from the oxidation of the sulfide minerals in the feed slurry. However, it should be appreciated that any method of providing for the solubilization of copper is within the scope of the present invention.

In accordance with one aspect of this exemplary embodiment, the high temperature pressure leaching process in pressure leaching vessel 10 preferably occurs in a manner suitably selected to promote the solubilization of the metal value to be recovered (e.g., copper). Various parameters may influence the high temperature pressure leaching process. For example, during pressure leaching, it may be desirable to introduce materials to enhance the pressure leaching process. In accordance with one aspect of the present invention, during pressure leaching in the pressure leaching vessel, sufficient oxygen 14 may be injected into the vessel to maintain an oxygen partial pressure from about 50 to about 200 psi, preferably from about 75 to about 150 psi, and most preferably from about 100 to about 125 psi. Furthermore, due to the nature of high temperature pressure leaching, the total operating pressure in the pressure leaching vessel is generally superatmospheric, preferably from about 250 to about 750 psi, more preferably from about 300 to about 700 psi, and most preferably from about 400 to about 600 psi.

The residence time for the high temperature pressure leaching process can vary, depending on factors such as, for example, the characteristics of the metal-bearing material and the operating pressure and temperature of the reactor. In one aspect of the invention, the residence time for the high temperature pressure leaching process ranges from about 30 to about 120 minutes.

Control of the pressure leaching process, including control of the temperature in pressure leaching vessel 10, may be accomplished by any conventional or hereafter devised method. For example, in accordance with one aspect of the invention, the temperature of the pressure leaching vessel 10 is maintained at from about 200° C. to about 235° C., and more preferably from about 215° C. to about 230° C. Due to the exothermic nature of pressure leaching of many metal sulfides, the heat generated by high temperature pressure leaching is generally more than that needed to heat feed slurry 5 to the desired operating temperature. Thus, in order to maintain preferable feed slurry temperature, a cooling liquid may be contacted with the feed slurry during pressure leaching. In accordance with one aspect of this embodiment of the present invention, a cooling liquid is preferably contacted with the feed stream in pressure leaching vessel 10 during pressure leaching. Cooling liquid may comprise make-up water, but can be any suitable cooling fluid from within the process or from an outside source, such as recycled liquid phase from the product slurry, neutralized raffinate solution 32, or a mixture of cooling fluids. Cooling liquid may be introduced into pressure leaching vessel 10 through the same inlet as feed slurry, or alternatively in any manner that effectuates cooling of feed slurry 5. The amount of cooling liquid added to feed slurry 5 during pressure leaching may vary according to the amount of sulfide minerals in and the pulp density of the feed slurry 5, as well as other parameters of the pressure leaching process. In a preferred aspect of this embodiment of the invention, a sufficient amount of cooling liquid is added to pressure leaching vessel 10 to yield a solids content in product slurry 18 on the order of less than about 50% solids by weight, and more preferably ranging from about 3 to about 35% solids by weight.

Figure 3:
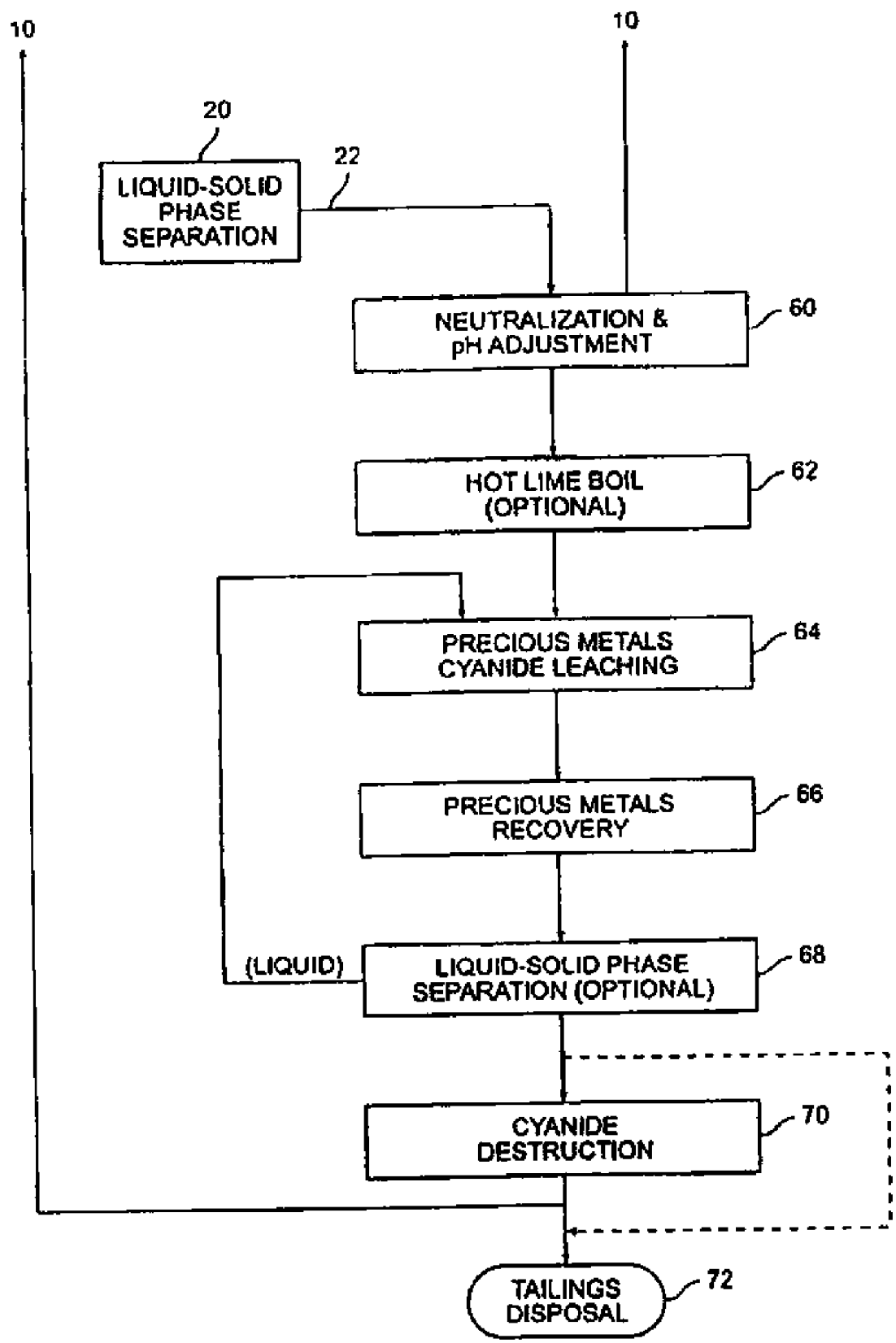
FIG. 3 illustrates a flow diagram of further aspects of the exemplary metal recovery process of FIG. 2.

In accordance with one aspect of the present invention, an unreactive seeding agent is introduced into a high temperature pressure leaching process to assist in metal recovery. Referring to FIGS. 2 and 3, in accordance with a preferred aspect of this embodiment of the present invention, residue 22 may be recycled to pressure leaching vessel 10 and used as a seeding agent. Residue 22 may be divided such that a portion is directed back to pressure leaching vessel 10 and the remainder may be either discarded or subjected to further metal recovery (such as, for example, as illustrated in an exemplary fashion in FIG. 3). For example, and as is shown in FIG. 3, the portion of residue stream 22 that is not recycled as a seeding agent to pressure leaching vessel 10 may undergo precious metal recovery using cyanidation or any other metal recovery technique. Particles in the portion of residue stream 22 that are recycled to pressure leaching vessel 10 may act as accumulation sites for precipitation of other materials, such as hematite, as described above, thus enhancing the amount of copper that may be recovered. Recycled residue 22 may be delivered to pressure leaching vessel 10 by pumping and piping to the pressure leaching vessel, a feed tank, or other suitable intermediate location. It should be appreciated that numerous other unreactive and/or reactive materials may be used as seeding agents in accordance with the present invention and may be used in combination with the feed stream to the pressure leaching vessel.

In accordance with a preferred aspect of the embodiment of the invention illustrated in FIG. 2, product slurry 18 from pressure leaching vessel 10 may be flashed in an atmospheric flash tank 16 or other suitable vessel to release pressure and to evaporatively cool product slurry 18 through the release of steam to form a flashed product slurry 24. Depending upon the specific process equipment configurations and specifications, more than one flash stage may be employed. Flashed product slurry 24 preferably has a temperature ranging from about 90° C. to about 105° C., a copper concentration of from about 35 to about 60 grams/liter, and an acid concentration of from about 10 to about 60 grams/liter.

Referring still to FIG. 2, flashed product slurry 24 may be directed to a solid-liquid separation apparatus 20, such as a counter-current decantation (CCD) circuit. Alternatively, the solid-liquid separation apparatus may comprise, for example, a thickener or a filter. In one aspect of a preferred embodiment of the invention, solid-liquid phase separation step 20 may be carried out with a conventional CCD utilizing conventional counter-current washing of the residue stream to recover leached copper to the copper-containing solution product and to minimize the amount of soluble copper advancing to precious metal recovery processes or storage. Preferably, large wash ratios are utilized to enhance the effectiveness of the solid-liquid separation stage—that is, relatively large amounts of wash water are added to the residue stream in CCD circuit 20. Preferably, flash product slurry 24 is diluted by the wash water in CCD circuit 20 to form a copper-containing solution having a copper concentration of from about 15 to about 60 grams/liter.

Depending on its composition, residue stream 22 from solid-liquid separation apparatus 20, as discussed above, may be used as a seeding agent during pressure leaching, may be disposed of or subjected to further processing, such as, for example, precious metal recovery. For example, if residue stream 22 contains an economically significant fraction of gold, it may be desirable to recover this gold fraction don through a cyanidation process or other suitable recovery process. If gold and/or other precious metals are to be recovered from residue stream 22 by cyanidation techniques, the content of contaminants in the stream, such as elemental sulfur, iron precipitates, and unreacted copper minerals, is preferably minimized. Such materials generally promote high reagent consumption in the cyanidation process and thus increase the expense of the precious metal recovery operation. Additionally, as mentioned above, it is preferable to use a large amount of wash water or other diluting solution during the solid-liquid separation process to maintain low copper and acid levels in the CCD residue in an attempt to optimize the residue stream conditions for precious metal recovery.

Referring now to FIG. 3, residue 22 from solid-liquid separation step 20 may be subjected to various further processing. Depending on the characteristics of residue 22, it may be advantageous to subject it to neutralization and/or pH adjustment, such as is illustrated in step 60. The residue once so treated may be recycled to pressure leaching 10, or subjected to further processing.

Such processing may include, with continued reference to FIG. 3, an optional hot lime boil (step 62) followed by precious metal recovery (step 66), such as through the use of conventional cyanide leaching (step 64) followed by liquid-solid phase separation (step 68). If cyanide leaching is used, the resultant tailings may be recycled to pressure leaching 10, as shown, to be used as a seeding agent, preferably after the cyanide is destroyed or attenuated (step 70), or alternatively disposed of (step 72). As illustrated in FIG. 3, various alternative processing routes may be utilized.

In accordance with various aspects of the present invention, even when there is little gold present in the residue, use of a seeding agent in the pressure leaching process can increase the recovery of the gold present in the residue stream. For example, although extraction of gold from the residue in pilot plant experiments was on the order of from about 73 to about 82% when a seeding agent was not introduced into the pressure leaching vessel, use of a seeding agent (e.g., hematite) during pressure leaching enabled laboratory gold extractions from the residue ranging from about 89 to about 91%.

Referring back to FIG. 2, in accordance with various aspects of the present invention, the recovery of the desired metal value (e.g., copper) may be accomplished through conventional solvent extraction/electrowinning (SX/EW) techniques. For example, a diluting solution 26 may be contacted with the separated liquid 28 from solid-liquid separation apparatus 20 to reduce the acid concentration of the separated liquid 28 sufficiently to provide desirable equilibrium conditions for solvent extraction 30. Solution 26 may be any suitable liquid, for example, water or atmospheric leach effluent solution, that sufficiently reduces the copper and acid concentrations to desired levels. In a preferred aspect of this embodiment of the invention, sufficient amount of solution 26 is contacted with the separated liquid stream 28 to yield an acid concentration in the diluted copper-containing solution preferably ranging from about 2 to about 25 grams/liter, and more preferably from about 4 to about 7 grams/liter and a pH preferably ranging from about pH 1.5 to about pH 2.5 and more preferably from about pH 1.8 to about pH 2.2, and optimally in the range of about pH 2.0.

The diluted copper-containing solution 29 may be farther processed in a solvent extraction step 30. During solvent extraction 30, copper from copper-containing solution 29 may be loaded selectively onto an organic chelating agent, for example, an aldoxime/ketoxime blend, resulting in a copper-containing organic stream 34 and a raffinate solution 32. Raffinate 32 from solvent extraction step 30 may be used in a number ways. For example, all or a portion of raffinate 32 maybe recycled to pressure leaching vessel 10 for temperature control or may be used in heap leaching operations, or may be used for a combination thereof The use of raffinate 32 in heap leaching operations may be beneficial because the acid and ferric/ferrous iron values contained in raffinate 32 can act to optimize the potential for leaching oxide and/or sulfide ores that commonly dominate heap leaching operations. That is, the ferric and acid concentration of raffinate 32 may be used to optimize the Eh and pH of heap leaching operations. It should be appreciated that the properties of raffinate 32, such as component concentrations, may be adjusted in accordance with the desired use of raffinate 32.

Copper-containing organic stream 34 is then subjected to a solvent stripping phase 40, wherein more acidic conditions may shift the equilibrium conditions to cause the copper in the reagents to be exchanged for the acid in a highly acidic stripping solution. As shown in FIG. 2, an acid-bearing reagent 38, preferably sulfuric acid, and optionally, lean electrolyte 48, are contacted with copper-containing organic stream 34 during solvent stripping phase 40. Sulfuric acid is a preferred acid-bearing reagent and is a desirable copper matrix for electrowinning operations. The acid-bearing reagent is contacted with the copper-containing organic stream to effectuate the exchange of acid for copper to provide copper for metal recovery 46.

Referring still to FIG. 2, copper-containing solution stream 42 from solvent stripping phase 40 may be sent to an electrolyte recycle tank 44. The electrolyte recycle tank may suitably facilitate process control for electrowinning stage 46, as will be discussed in greater detail below. Copper-containing solution stream 42, which generally contains from about 35 to about 50 grams/liter of copper and from about 160 to about 180 grams/liter acid, is preferably blended with a lean electrolyte 48 (i.e., electrolyte that has already been through the metal recovery phase and has had a portion of its dissolved copper removed) and make-up fluid 52, such as, for example, water, in the electrolyte recycle tank 44 at a ratio suitable to yield a product stream 50, the conditions of which may be chosen to optimize the resultant product of metal recovery 46.

Preferably, the copper composition of product stream 50 is maintained substantially constant at a value from about 20 to about 60 grams/liter, more preferably at a value from about 30 to about 50 grams/liter. Copper values from the copper-containing product stream 50 are removed during metal recovery step 46, preferably using electrowinning, to yield a pure, cathode copper product. It should be appreciated that in accordance with the various aspects of the invention, a process wherein, upon proper conditioning of the copper-containing solution, a high quality, uniformly-plated cathode copper product may be realized without subjecting the copper-containing solution to solvent extraction prior to entering the electrowinning circuit is within the scope of the present invention. As those skilled in the art are aware, a variety of methods and apparatus are available for the electrowinning of copper and other metal values, any of which may be suitable for use in accordance with the present invention, provided the requisite process parameters for the chosen method or apparatus are satisfied.

The present invention has been described above with reference to a number of exemplary embodiments. It should be appreciated that the particular embodiments shown and described herein are illustrative of the invention and its best mode and are not intended to limit in any way the scope of the invention as set forth in the claims. Those skilled in the art having read this disclosure will recognize that changes and modifications may be made to the exemplary embodiments without departing from the scope of the present invention. For example, although reference has been made throughout to various metal value recovery examples, it is intended that the invention also be applicable to the recovery of other materials that may be recovered through reactive processing that incorporate use of a seeding agent. Further, although certain preferred aspects of the invention, such as materials for seeding the reactive process, for example, are described herein in terms of exemplary embodiments, such aspects of the invention may be achieved through any number of suitable means now known or hereafter devised. Accordingly, these and other changes or modifications are intended to be included within the scope of the present invention, as expressed in the following claims.

What is claimed is:

1. A process for recovering a metal value comprising:
    subjecting a metal-bearing material to a reactive process;
    incorporating at least one seeding agent into said reactive process at a temperature greater than about 120° C.;
    obtaining a product from said reactive process wherein at least one metal value is present in said product and wherein said metal value comprises at least one of copper, gold, silver, nickel, cobalt, molybdenum, zinc, rhenium, uranium, rare earth metal, and platinum group metal; and
    extracting said at least one metal value from said product using electrowinning.

2. A process for recovering a metal value according to claim 1, wherein said at least one seeding agent comprises hematite.

3. A process for recovering a metal value according to claim 1, wherein said seeding agent comprises at least a portion of a residue from said reactive process.

4. A process for recovering a metal value according to claim 3, further comprising the step of recovering at least one metal present in said residue from said reactive process before using said residue as said seeding agent.

5. A process for recovering a metal value according to claim 4, wherein said metal present in said residue is selected from the group consisting of copper, gold, silver, nickel, cobalt, molybdenum, zinc, rhenium, uranium, rare earth metals, and platinum group metals.

6. A process for recovering a metal value according to claim 1, wherein said step of subjecting a metal-bearing material to a reactive process produces acid, and further comprising the step of utilizing at least a portion of the acid produced by said reactive process in a heap leaching operation or an agitated leaching operation.

7. A process for recovering a metal value according to claim 1, wherein said step of extracting at least one metal value from said product comprises extracting at least one precious metal from said product.

8. A process for recovering a metal value according to claim 1, wherein said step of extracting at least one metal value from said product comprises extracting gold from said product.

9. A process for recovering a metal value according to claim 1, wherein said step of incorporating a seeding agent into said reactive process comprises incorporating a seeding agent into said reactive process at a temperature from about 170° C. to about 235° C.

10. A process for recovering a metal value according to claim 1, wherein said step of subjecting a metal-bearing material to a reactive process comprises subjecting the metal-bearing material to leaching.

11. A process for recovering a metal value according to claim 1, wherein said leaching process is accomplished with at least one of elevated pressure, elevated temperature, and acid addition.

12. A process for recovering a metal value comprising:
    subjecting a metal-bearing material to a conditioning process;
    subjecting said conditioning process product to a reactive process to liberate a metal value;
    incorporating at least one seeding agent into said reactive process, wherein said seeding agent provides a nucleation site; and
    extracting at least one metal value from said reactive process product using electrowinning.

13. A process for recovering a metal value according to claim 12, wherein said step of subjecting a metal-bearing material to a conditioning process comprises subjecting the metal-bearing material to at least one of comminution, flotation, blending and slurry formation.

14. A process for recovering a metal value according to claim 12, wherein said step of incorporating at least one seeding agent into said reactive process comprises the incorporation of a seeding agent, which nucleates a species other than the metal value.

15. A process for recovering a metal value according to claim 12, wherein said step of incorporating at least one seeding agent into said reactive process comprises the incorporation of a seeding agent, which nucleates the metal value.

16. A process for recovering a metal value comprising:
    subjecting a metal-bearing material to a separation process;
    subjecting said separation process product to a reactive process to liberate a metal value;
    incorporating at least one seeding agent into the reactive process wherein said seeding agent provides a nucleation site; and
    extracting at least one metal value from said reactive process product using electrowinning.

17. A process for recovering a metal value according to claim 16, wherein said step of subjecting a metal-bearing material to a separation process comprises subjecting the metal-bearing material to at least one of flash distillation, filtration, counter-current decantation circuits (CCD) and centrifuges.

18. A process for recovering a metal value according to claim 16, wherein said step of incorporating at least one seeding agent into said reactive process comprises the incorporation of a seeding agent, which nucleates a species other than the metal value.

19. A process for recovering a metal value according to claim 16, wherein said step of incorporating at least one seeding agent into said reactive process comprises the incorporation of a seeding agent, which nucleates the metal value.

* * * * *